UNITED STATES PATENT OFFICE.

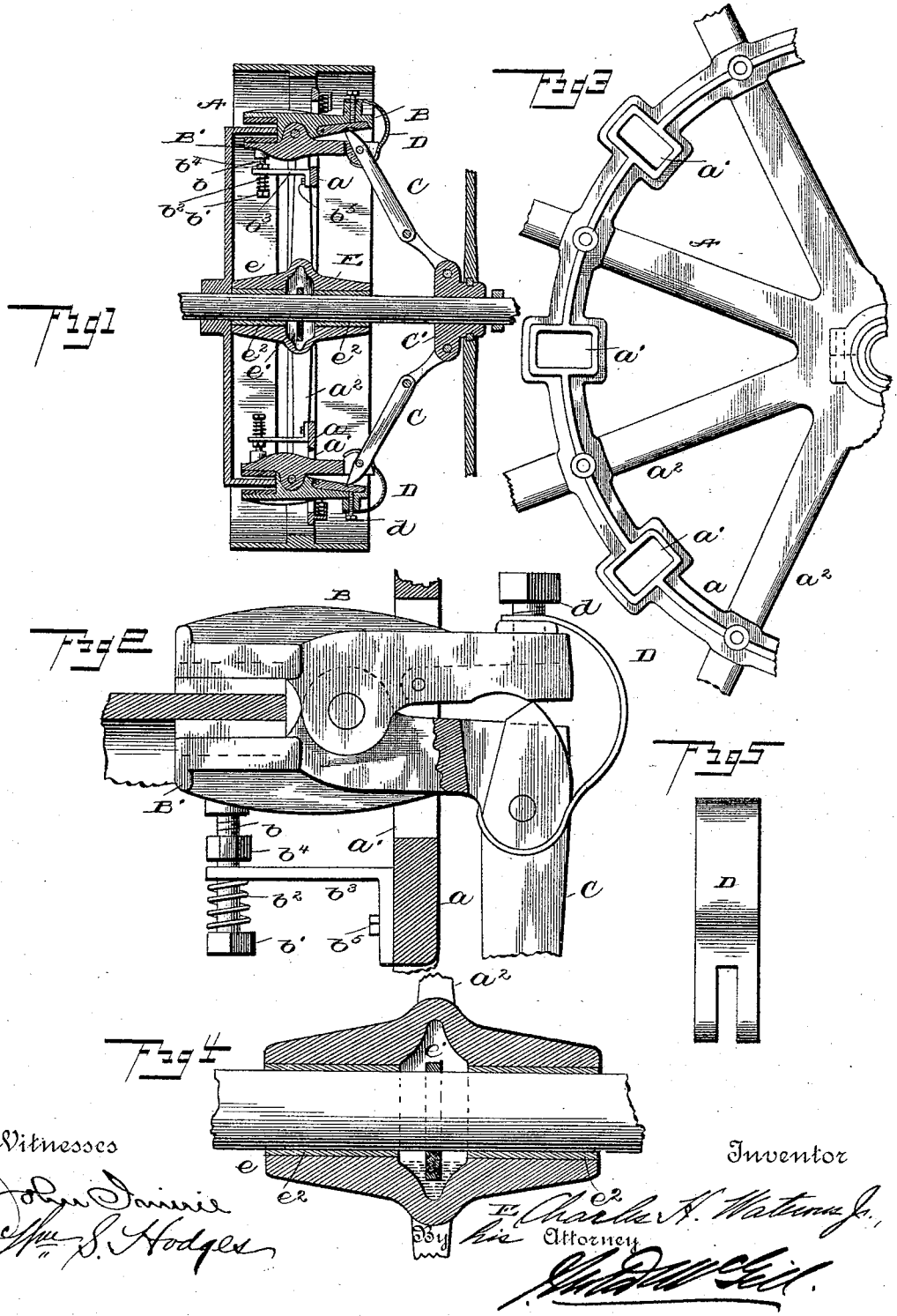

CHARLES H. WATEROUS, JR., OF BRANTFORD, CANADA.

CLUTCH-PULLEY.

SPECIFICATION forming part of Letters Patent No. 499,617, dated June 13, 1893.

Application filed October 2, 1891. Serial No. 407,547. (No model.)

*To all whom it may concern:*

Be it known that I, CHARLES H. WATEROUS, Jr., a subject of the Queen of Great Britain, residing at Brantford, in the county of Brant and Province of Ontario, Canada, have invented certain new and useful Improvements in Clutch-Pulleys, of which the following is a specification, reference being had therein to the accompanying drawings.

This invention relates to an improved pulley, having reference more especially to clutch pulleys, and being designed as an improvement in several particulars on the pulleys shown and described in Letters-Patent No. 447,217, dated February 24, 1891, issued to myself and James N. Peel.

The present invention has for its object, first, the provision of simple and highly efficient means by which the clutches can be readily attached to a pulley, and the strength of the latter greatly increased; and second, to prevent wabbling of the clutches or contact thereof with the friction wheel when not in operation.

To these ends the invention consists, first, in a pulley having a ring or band provided with a series of loops for the reception of the clutch arms and designed to be attached directly to the arms or spokes of said pulley, whereby the strength of the latter is materially increased and the application of the clutches to the pulley is greatly facilitated.

The invention further consists in a spring held rod projecting from the inner end of the inner clutch-arm tending to draw inwardly on said clutch-arm.

The invention further consists in a plate-spring engaging the outer ends of the clutch-arms drawing said ends toward each other and holding the inner ends thereof apart.

The invention also comprises the detail construction, combination and arrangement of parts, substantially as hereinafter fully set forth and particularly pointed out in the claims.

In the accompanying drawings:—Figure 1 is a vertical sectional view of a pulley constructed in accordance with my improvements. Fig. 2 is an enlarged view of the clutch arms. Fig. 3 is a front view of a portion of the pulley with the clutch arms removed. Fig. 4 is a vertical sectional view of the hub, showing the bearings and bushings. Fig. 5 is a detail.

Referring to the drawings, A designates a clutch pulley of the form shown and described in the before mentioned patent; and $a$ is a continuous ring or band which is provided with a plurality of loops $a'$ throughout its circumference. In these loops $a'$ the clutch arms B of the pulley are designed to be located after the manner shown in said patent. This ring or band is bolted or otherwise securely fastened to each arm or spoke $a^2$ of pulley A. By this means the arms or spokes are all held firmly united to each other and consequently the strength of the pulley is greatly increased. The clutch arms are generally placed in position in the loops of the ring or band while at the factory, and in this manner are kept in stock ready to be applied to any pulley upon demand. In this way both the manufacture and shipping are greatly facilitated, and the strength of the pulley is not only not impaired, as is generally caused by the strain of the gripping arms, but all the spokes are held firm in fixed relation to each other.

It has been found in practice that in pulleys of large size or dimensions the weight of the parts is so great that the inner ends of the clutch arms are liable to fall into slight contact with the friction band, resulting in the heating of the parts which is very annoying, besides being detrimental to the pulley. I have therefore devised means to overcome this difficulty and prevent the contact faces of the clutch-arms from touching the friction band when the pulley is not in use.

From the inner arm B, of each set of clutch arms projects a short threaded rod $b$ having a head $b'$ against which bears one end of a coil spring $b^2$, the other end thereof bearing against an arm or bracket $b^3$ through a hole or opening in which said rod is projected. An adjustable nut $b^4$ works on rod $b$, and by reason of contact with bracket $b^3$ limits the extent of movement of the clutch arm B' under the action of the coil spring $b^2$. The arm or bracket $b^3$ has an inner angular end through which a bolt $b^5$ is passed for attaching it to the inner cross-bar of loop $a'$ of ring or band $a$. The clutch-arms are constructed and operated precisely as shown and described in the before-mentioned patent. To the outer end of the inner arm B' is pivotally connected the outer end of a grip-lever C, the extreme end of said lever bearing against the end of the outer lever arm so that when the collar C', to which the inner end of lever C is connected, is forced inward the lever will force the outer ends of the clutch arms apart, causing their inner ends to bind against the friction-band. When this collar is moved inward so as to effect the disengagement of the clutch-arms from contact with the friction band, the coil spring $b^2$ will at once hold the inner end of clutch-arm B' away from contact with said friction band. To further aid in the accomplishment of this result, I employ a curved plate-spring D which fits over the outer ends of the clutch-arms tending to draw said ends toward each other, and additionally hold the inner ends of both arms out of contact with the friction band. This plate spring is held in place by a set-screw $d$ (corresponding to the set screw $f^2$ shown and described in said patent) passed through an eye or hole thereof, and its inner end is forked so as to pass on both sides of the clutch lever C.

The hub E of the pulley is provided with two end-bearings $e$ and an intermediate space or channel $e'$ for containing a lubricant, and two independent bushings $e^2$ for said bearing ends $e$. The inner opposite ends of these bushings $e^2$ project inwardly a short distance beyond the bearing $e$ into space or channel $e'$. In this class of inventions, by reason of the clutch connections, there is always a tendency of the hub of the pulley to wear at each end but not in the center, and thus the pulley is caused to wabble on the shaft and run unevenly. Hence by providing the pulley with two bearing points, one at each end of the hub, leaving the center free without any bearing on, or contact with, the shaft, this objection is avoided, and the pulley is made to last much longer and give far better satisfaction. But this feature of my invention forms the subject matter of a separate application for patent filed January 26, 1892, Serial No. 419,336, and hence further mention thereof herein is unnecessary.

The advantages of my invention are apparent to those skilled in the art, and it will be especially observed that by reason thereof a pulley will last much longer, is greatly strengthened, and the application of the clutch arms facilitated, and the wearing thereof when not in use entirely avoided.

I claim as my invention—

1. A clutch pulley having a support for its clutch-arms consisting of a single continuous ring or band secured throughout its length to the spokes of the pulley, whereby said spokes are firmly held in proper relation to each other, as set forth.

2. A clutch pulley having a support for its clutch arms consisting of a single continuous ring or band provided with loops for reception of the clutch arms and secured throughout its length to each of the spokes of said pulley, said loops being integral with said ring or band and located between said spokes, substantially as set forth.

3. A clutch-pulley having inner and outer clutch arms, a spring connected with the inner end of said inner clutch-arm, and a second spring engaging the outer ends of said arms, substantially as set forth.

4. A clutch pulley having inner and outer clutch-arms, a threaded rod projecting from the inner end of said inner arm, a coil spring encircling said rod, a bearing for the inner end of said spring secured to said pulley, and an adjustable nut on said rod adjacent to said bearing with which it is designed to come in contact to limit the movement of said clutch-arms, substantially as set forth.

5. A clutch pulley having inner and outer clutch arms, a threaded rod projecting from the inner end of said inner arm, a coil spring encircling said rod, an arm or bracket secured to the pulley and through which said rod is passed and against which said spring bears, and an adjustable nut on said rod, as set forth.

6. A clutch-pulley having a continuous ring or band secured to its spokes and provided with loops, arms or brackets attached to said loops, and having holes or openings in their outer ends, the inner and outer clutch arms projected through and pivotally mounted in said loops, the threaded rod projecting from the inner end of said inner arm and extended through said hole or opening of said arm or bracket, the coil spring encircling said rod and bearing against said arm or bracket, and the adjustable nut on said rod, substantially as set forth.

7. A clutch-pulley having inner and outer pivoted clutch-arms, and the plate spring engaging the outer ends of said arms, substantially as set forth.

8. The combination with the clutch arms, one of which has a set screw, of the curved plate spring held at one end by said set screw and having its other end forked and engaging the outer end of the other clutch arm, substantially as set forth.

In testimony whereof I affix my signature in presence of two witnesses.

C. H. WATEROUS, JR.

Witnesses:
B. HEATON,
C. S. PERLEY.